US007595912B2

(12) United States Patent
Takahashi et al.

(10) Patent No.: US 7,595,912 B2
(45) Date of Patent: Sep. 29, 2009

(54) IMAGE FORMING SYSTEM AND METHOD

(75) Inventors: Atsuya Takahashi, Mishima (JP); Akihiro Nakamura, Mishima (JP); Kaoru Sato, Minamiashigara (JP); Kazuhisa Maruyama, Sagamihara (JP); Ryuichi Yoshizawa, Yokohama (JP)

(73) Assignee: Canon Kabusihiki Kaisha, Tokyo (JP)

( * ) Notice: Subject to any disclaimer, the term of this patent is extended or adjusted under 35 U.S.C. 154(b) by 368 days.

(21) Appl. No.: 11/429,209

(22) Filed: May 8, 2006

(65) Prior Publication Data

US 2006/0256393 A1 Nov. 16, 2006

(30) Foreign Application Priority Data

May 13, 2005 (JP) ............................ 2005-141210

(51) Int. Cl.
*H04N 1/00* (2006.01)
*H04N 1/04* (2006.01)
*G03G 21/00* (2006.01)

(52) U.S. Cl. ......................... 358/404; 358/496; 399/19; 399/20

(58) Field of Classification Search ....................... None
See application file for complete search history.

(56) References Cited

U.S. PATENT DOCUMENTS

| | | | | |
|---|---|---|---|---|
| 5,713,060 | A | 1/1998 | Sato et al. | 399/20 |
| 6,205,297 | B1 | 3/2001 | Tachibana et al. | 399/21 |
| 7,190,916 | B2 | 3/2007 | Yoshizawa | 399/82 |
| 2004/0239976 | A1 | 12/2004 | Takahashi | 358/1.14 |
| 2006/0256354 | A1 | 11/2006 | Nakamura et al. | 358/1.1 |

FOREIGN PATENT DOCUMENTS

| | | | | |
|---|---|---|---|---|
| JP | 03018540 | A | * | 1/1991 |
| JP | 06305605 | A | * | 11/1994 |
| JP | 9-11559 | | | 1/1997 |
| JP | 9-104141 | | | 4/1997 |
| JP | 2000086013 | A | * | 3/2000 |
| JP | 2001337562 | A | * | 12/2001 |

* cited by examiner

*Primary Examiner*—Daniel J Colilla
*Assistant Examiner*—Allister Primo
(74) *Attorney, Agent, or Firm*—Fitzpatrick, Cella, Harper & Scinto

(57) ABSTRACT

At step S301, since none of conveyance sensors 114, 116 and 121 detect residual paper, a CPU 203 notifies a CPU 201 that it is in a residual paper check start instruction waiting mode. At step S302, since a conveying path sensor 111 in an optional paper feed unit 101 does not detect residual paper, the CPU 202 notifies the CPU 201 that it is in a residual paper check start instruction waiting mode. At step S303, since an inlet sensor 122 of an optional paper output unit 103 does not detect residual paper, the CPU 204 notifies the CPU 201 that it is in a residual paper check start instruction waiting mode. After confirming that all the units are in the waiting mode, the CPU 201 issues a residual paper check start instruction to all the units simultaneously to improve usability by reducing initializing time.

13 Claims, 5 Drawing Sheets

FIG.4
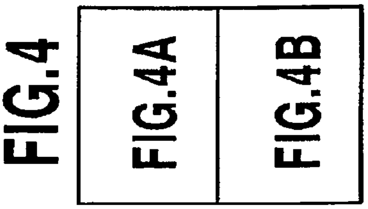
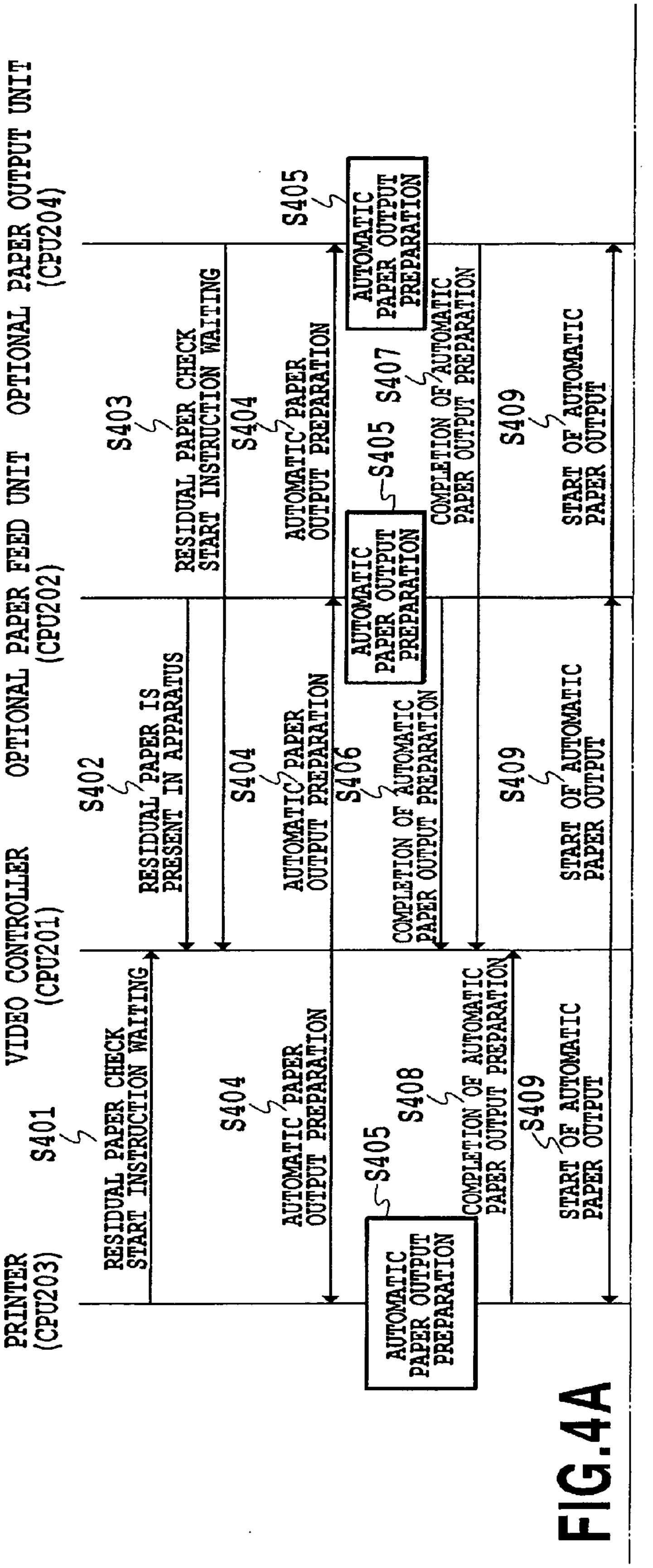
FIG.4A

IMAGE FORMING SYSTEM AND METHOD

BACKGROUND OF THE INVENTION

1. Field of the Invention

The present invention relates to an image forming system and method, and more particularly to an image forming system and method using an image processing unit to which an optional paper feed unit or an optional paper output unit is connected.

2. Description of the Related Art

Conventionally, technology of a printer system has been proposed in which an optional paper feed unit or optional paper output unit is connected to an image forming apparatus. In such a system, when useless residual paper is present on a paper conveying path at power-on or before jam recovery, or when residual paper remains over a plurality of units, automatic paper output of the useless residual paper is started by carrying out paper conveyance operation of the individual units. Thus, the residual paper is automatically ejected to the outside of the apparatus accurately without causing undesirable damage to the residual paper (for example, see Japanese Patent Application Laid-open Nos. 09-011559/1997 and 09-104141/1997).

In the conventional technology, however, if the residual paper remains at a place where paper detecting sensors on the conveying path of the units cannot detect the residual paper even if it extends over the plurality of units, a condition occurs in which the units cannot start the conveyance operation at the same time. Accordingly, pulling or pushing of the residual paper occurs between the units, which can cause damage to both the residual paper and units. This hinders smooth automatic paper output, thereby presenting a problem in that a user must remove the residual paper to be ejected automatically as jam paper.

In addition, the check operation of the residual paper or the start or stop of the automatic paper output is not synchronized between the units. This offers a problem of excessive driving of the conveying path of the units, or of hindering the residual paper from being ejected to the outside without fail.

The present invention is implemented to solve the foregoing problems. It is therefore an object of the present invention to improve the usability by reducing the initializing time period of the apparatus by optimizing the detection processing of the residual paper in the apparatus at power-on or jam recovery and the timing of the start and stop processing of the automatic paper output.

SUMMARY OF THE INVENTION

To accomplish the objects, according to the present invention, there is provided an image forming system including a paper feed unit for supplying a recording medium, and an image forming unit for forming an image on the recording medium, the image forming system comprising: a recording medium detecting section for detecting the recording medium being conveyed through a conveying path of the paper feed unit; an instructing section for instructing the paper feed unit and the image forming unit to start operation to eject the recording medium, when the recording medium detecting section detects the recording medium; a first control section for causing the image forming unit to start recording medium conveyance operation in response to an operation start instruction by the instructing section; and a second control section for causing the paper feed unit to start recording medium conveyance operation in response to an operation start instruction by the instructing section, and for transmitting an operation completion signal of the paper feed unit to the instructing section when the conveyance operation has been completed, wherein the first control section decides completion of the recording medium conveyance operation of the image forming unit in response to the operation completion signal of the paper feed unit transmitted from the instructing section.

According to the present invention, there is provided a control method of an image forming system including a paper feed unit for supplying a recording medium, and an image forming unit for forming an image on the recording medium, the control method comprising: a first notification step of notifying an instructing section of the image forming unit of detecting the recording medium on a conveying path of the paper feed unit; an instruction step of causing the instructing section to instruct the paper feed unit and the image forming unit to start operation; a first control step of causing the image forming unit to start recording medium conveyance operation in response to an operation start instruction; a second control step of causing the paper feed unit to start recording medium conveyance operation in response to the operation start instruction; a second notification step of sending an operation completion signal to the instructing section when the recording medium conveyance operation of the paper feed unit has been completed; and a decision step of deciding completion of the recording medium conveyance operation of the image forming unit in response to an operation completion signal transmitted from the instructing section.

The above and other objects, effects, features and advantages of the present invention will become more apparent from the following description of embodiments thereof taken in conjunction with the accompanying drawings.

BRIEF DESCRIPTION OF THE DRAWINGS

FIG. 4 is a diagram showing the relationship of FIGS. 4A and 4B;

FIG. 4A is a chart illustrating a sequence of a second embodiment in accordance with the present invention.

DETAILED DESCRIPTION OF THE PREFERRED EMBODIMENTS

A recording medium decision unit and image forming unit and a method thereof in accordance with the present invention will now be described with reference to the accompanying drawings.

First Embodiment

Figure 1:
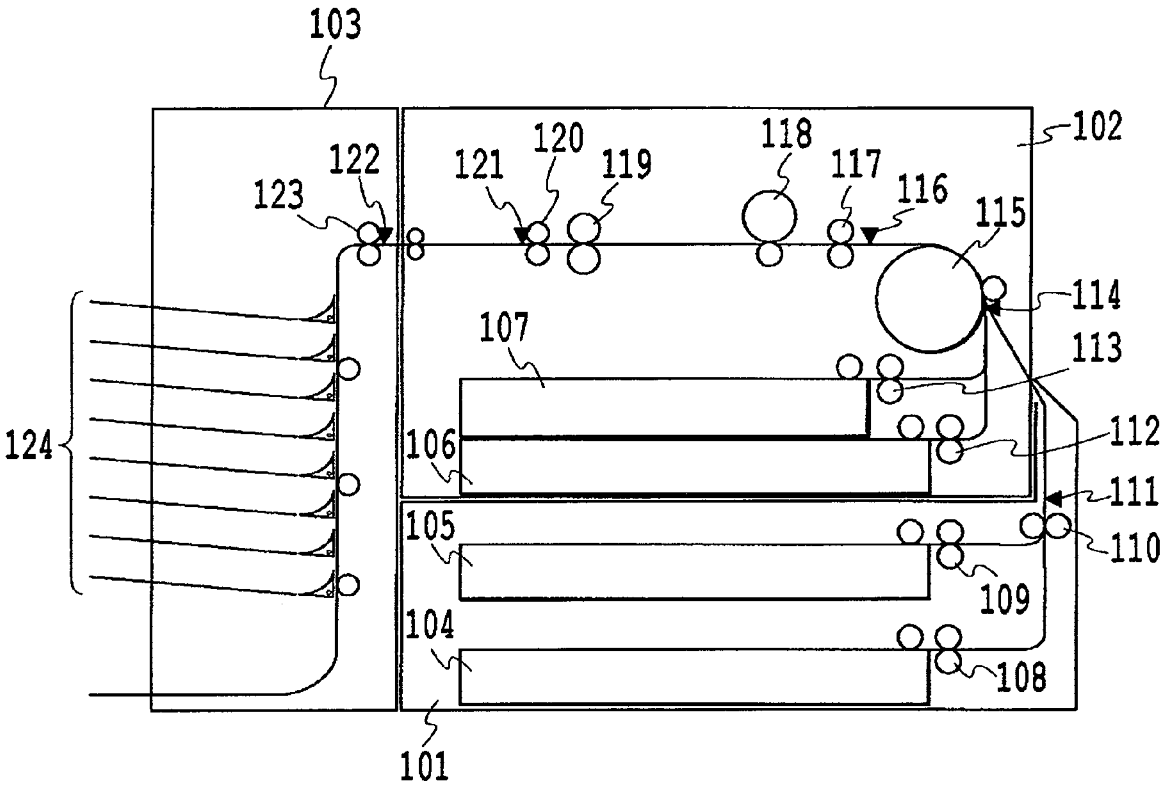
FIG. 1 is a structural diagram illustrating a mechanism of a first embodiment in accordance with the present invention.

FIG. 1 is a schematic diagram showing an image forming unit of a first embodiment in accordance with the present invention. In FIG. 1, an optional paper feed unit 101 includes a lower deck 104 and an upper deck 105, and paper feed rollers 108 and 109 for feeding paper stacked on the decks. Downstream of a conveying roller 110 for supplying the paper from the deck 104 or 105 into a printer 102, a paper outlet sensor 111 is disposed.

The printer 102 includes a lower deck 106 and upper deck 107 having a paper feed roller 112 and paper feed roller 113, respectively. A paper feed sensor 114 in the printer detects the paper fed from the optional paper feed unit 101, or the paper fed from the lower deck 106 or upper deck 107. A paper feed conveying roller 115 for further conveying the paper feeds the paper up to the position at which a prescribed loop is formed by a registration roller 117. A paper sensor (abbreviated to pre-regist sensor from now on) 116 for detecting the front edge of the paper being conveyed is provided for shaping the loop. The start timing of the rotation of the registration roller 117 is determined with reference to the detection timing of the front edge of the paper by the pre-regist sensor 116.

To transfer the image formed on a photoconductive drum 118 to the paper accurately, the rotation start timing of the registration roller 117 is controlled. The registration roller 117 keeps its undriven state for a predetermined time period after the paper sensor 116 detects the front edge of the paper, in the course of which the paper is conveyed by a prescribed amount, thereby forming the loop of the paper. The registration roller 117 is driven after the predetermined time period so that the image on the photoconductive drum is transferred to the paper during the conveyance of the paper. After that, the paper to which the image is transferred is conveyed through a fixing unit 119 and fixed paper output roller 120, and is ejected from the printer. A sensor 121, which is disposed at the lowest position of the paper conveying path of the printer 102, monitors the conveyance state of the paper to be output.

When an inlet sensor 122 detects the paper output from the printer 102, an optional paper output unit 103 which is a recording medium paper output unit takes in and conveys the paper with a conveying roller 123, and ejects the paper to the designated one of paper output bin 124.

Figure 2:
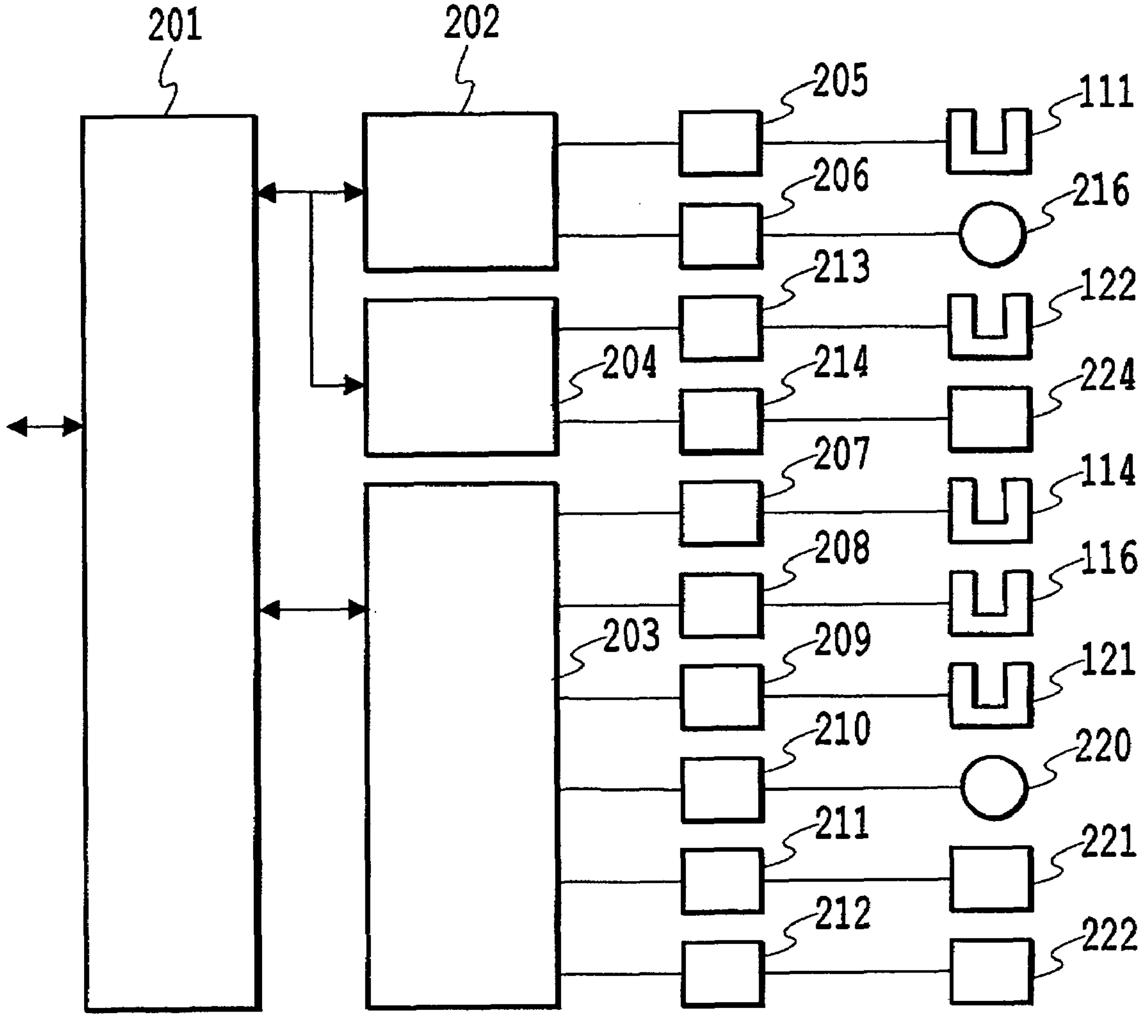
FIG. 2 is a block diagram illustrating a circuit configuration of the first embodiment in accordance with the present invention.

FIG. 2 is a block diagram illustrating an electric circuit of the image forming unit of an embodiment in accordance with the present invention. The image forming unit of the present embodiment assumes a configuration in which a video controller, which manages an image forming unit that will be described later, controls the operation of the optional paper feed unit 101 and optional paper output unit 103. Such a configuration offers an advantage in that the processing load is reduced because the printer controller for controlling the image forming operation of the image forming unit need not manage the optional paper feed unit or optional paper output unit. In addition, when a new optional unit is introduced, it can be installed in the image forming unit by changing the control software on the video controller, which offers an advantage of increasing the flexibility of adding an optional unit.

In FIG. 2, a microcomputer (abbreviated to CPU from now on) 201 installed in the video controller for managing the image forming unit carries out processing of the image data and commands fed from the host, and controls by making communication with a microcomputer 202 (abbreviated to CPU 202 from now on) for controlling the optional paper feed unit 101. In addition, the CPU 201 controls the individual units by carrying out communication such as serial communication with a microcomputer 203 (abbreviated to CPU 203 from now on) installed in the printer controller for controlling the printer 102 and with a microcomputer 204 (abbreviated to CPU 204 from now on) for controlling the optional paper output unit 103.

A sensor input circuit 205 supplies the CPU 202 with a detection signal output from the outlet sensor 111 in the optional paper feed unit 101 which is a recording medium carrying-in unit. A driving circuit 206 of a motor 216 for rotating the conveying rollers 108, 109 and 110 of the optional paper feed unit 101 is controlled by a driving signal output from the CPU 202. The CPU 202 causes paper to be fed and conveyed from a desired deck by carrying out the paper feed command and conveyance command fed from the CPU 201.

Input circuits 207, 208 and 209 supply the CPU 203 with the detection signals of the paper feed sensor 114, pre-regist sensor 116 and fixed paper output sensor 121 located on the conveying path in the printer. A driving circuit 210 of a main motor 220 that drives all the rollers in the printer and the photoconductive drum is controlled by the driving signal output from the CPU 203. A driving circuit 211 of a clutch 221 for transmitting the rotation of the main motor 220 to the paper feed conveying roller 115 is controlled by a driving signal output from the CPU 203. A driving circuit 212 of a clutch 222 for transmitting rotation of the main motor 220 to the registration roller 117 is controlled by a driving signal output from the CPU 203. The CPU 203 causes the paper to be conveyed to the optional paper output unit 103 in response to a conveyance command fed from the CPU 201.

The sensor input circuit 213 supplies the CPU 204 with a detection signal of the inlet sensor 122 of the optional paper output unit 103. A driving circuit 214 of a motor 224 for rotating the conveying roller 123 of the optional paper output unit 103 undergoes ON/OFF control of the clutch in response to the driving signal output from the CPU 204. The CPU 204 causes the paper to be conveyed from the printer 102 in response to the conveyance command fed from the CPU 201.

Figure 3:
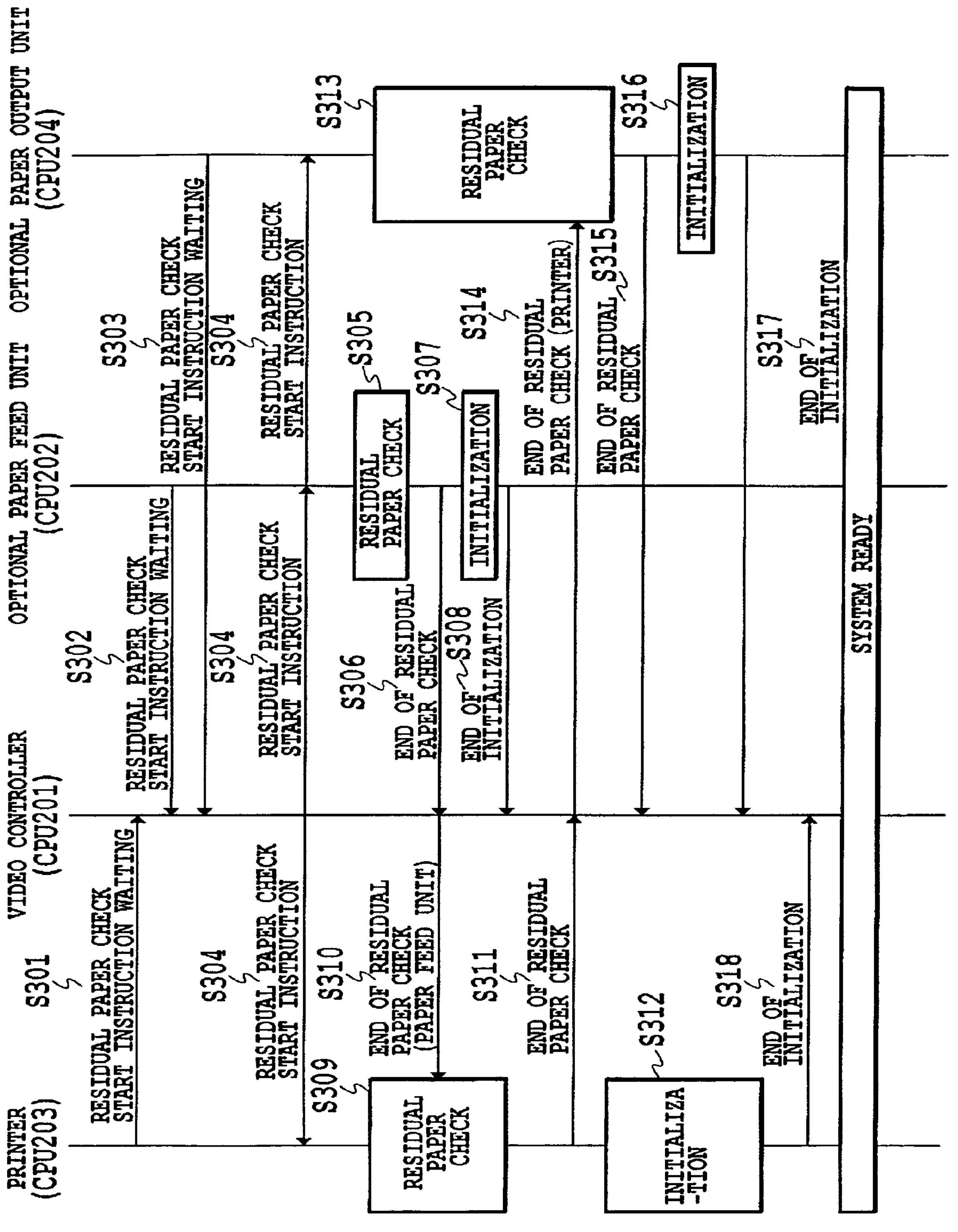
FIG. 3 is a chart illustrating a sequence of the first embodiment in accordance with the present invention.

FIG. 3 is a sequence chart illustrating the control sequence between the CPU 201 and CPU 202, between the CPU 201 and CPU 203, between the CPU 201 and CPU 204, and between the CPU 202, CPU 203 and CPU 204 at power-on or initialization after jam processing in the present embodiment.

The present embodiment is described by way of example in which the image forming unit includes no useless residual paper.

In FIG. 3, at step S301, since none of the conveyance sensors 114, 116 and 121 in the printer detect the residual paper, the CPU 203 notifies the CPU 201 that it is in a residual paper check start instruction waiting mode. Likewise, at step S302, since the conveying path sensor 111 in the optional paper feed unit 101 does not detect any residual paper, the CPU 202 notifies the CPU 201 that it is in a residual paper check start instruction waiting mode.

At step S303, since the inlet sensor 122 of the optional paper output unit 103 does not detect any residual paper, the CPU 204 notifies the CPU 201 that it is in a residual paper check start instruction waiting mode. After confirming that all the units are in the residual paper check start waiting mode, the CPU 201 provides a residual paper check start instruction to all the units simultaneously at step S304.

At step S305, the CPU 202, receiving the residual paper check start instruction, drives the conveying roller 110 for the predetermined time period, and detects the residual paper by conveying it to the paper outlet sensor 111 if it remains upstream of the paper outlet sensor 111. Unless the paper outlet sensor detects the residual paper even if driving the conveying roller 110 for the predetermined time period, the CPU 202 notifies the CPU 201 of the end of the residual paper check at step S306, stops driving the conveying roller 110, and carries out the initializing processing at S307. Then at S308, the CPU 202 notifies the CPU 201 of the end of the initialization. The term "Initializing processing" refers to paper feed preparing processing of the paper feed unit such as lift up operation of a lifter (not shown) for holding recording mediums in the lower deck 106 or upper deck 107 in the optional paper feed unit 101.

The CPU 203, receiving the residual paper check start instruction from the CPU 201, drives the main motor 220 in order to detect with a downstream sensor the residual paper between the paper outlet sensor 111 of the optional paper feed unit 101 and the paper feed sensor 114 (S309). In addition, the CPU 203 drives the main motor 220 in order to detect with a downstream sensor the residual paper between the lower deck 106 or upper deck 107 and the paper feed sensor 114, the residual paper between the paper feed sensor 114 and the pre-regist sensor 116, and the residual paper between the pre-regist sensor 116 and the fixed paper output sensor 121. Receiving the notification that the residual paper check of the optional paper feed unit 101 has been completed from the CPU 201 at step S310, the CPU 203 confirms that no residual paper is detected even by driving the main motor 220 for the predetermined time period, and notifies the CPU 201 of the end of the residual paper check (S311). Following the completion of the residual paper check, the CPU 203 carries out the initializing processing such as starting the fixing unit and initializing the electrophotographic process for carrying out the image forming at step S312.

At step S304, the CPU 204, receiving the residual paper check start instruction from the CPU 201, starts the residual paper check for confirming as to whether the residual paper is present or not from the fixed paper output sensor 121 to the inlet sensor 122 at step S313. In addition, the CPU 204 drives the conveying roller 123 in order to eject all the residual paper from the inlet sensor 122 to the paper output bin 124 to the paper output bin.

Receiving the notification that the residual paper check of the printer 101 has been completed from the CPU 203 at step S311, the CPU 201 notifies the CPU 204 in the optional paper output unit 103 at step S314. Receiving the notification that the residual paper check of the printer 102 has been completed from the CPU 201 at step S314, the CPU 204 confirms that no residual paper is detected even after the predetermined time period has elapsed from the residual paper check start, and notifies the CPU 201 of the end of the residual paper check at step S315. In addition, the CPU 204 simultaneously starts the initialization of the paper output bin 124 (such as moving the paper output bin to its home position) at step S316.

After completing the initializing processing of the paper output bin 124, the CPU 204 stops the driving of the optional paper output unit 103, and notifies the CPU 201 of it at step S317. After completing the initializing step S312 of the printer, the CPU 203 stops the driving of the printer, and notifies the CPU 201 of it at step S318. When the CPU 201 confirms the completion of the initialization of all the units, it makes a decision that the system is ready, and enables the print operation.

Thus, the CPU 201 issues the residual paper check start instruction to the printer 102, optional paper feed unit 101, and optional paper output unit 103 all at once. Subsequently, the residual paper check operation is completed in the order of the optional paper feed unit 101→printer 102→optional paper output unit 103. Then, the initializing processing of the individual units is carried out successively after completing the residual paper check operation of the individual units. These operations are performed in response to the instructions from the CPU 201 with recognizing between the individual units that the residual paper check has been completed. As a result, the printer 102, to which the optional paper feed unit 101 and optional paper output unit 103 are connected, can carry out the residual paper check and initializing operation optimally. This makes it possible to eliminate the useless operation such as driving the motors more than necessary for the residual paper check or initializing operation.

In addition, this makes it possible to detect the residual paper properly in shorter time, and to prevent the detected residual paper from being damaged, thereby being able to improve the usability.

Second Embodiment

The first embodiment is described by way of example in which the image forming unit includes no useless residual paper. The present embodiment will be described by way of example in which automatic paper output is carried out because the paper outlet sensor 111 of the optional paper feed unit detects the residual paper during the initialization at power-on or after jam processing. As for the configuration of the image forming unit in the present embodiment, the schematic view of FIG. 1 is used as in the first embodiment, and as for the electric circuit of the image forming unit, the block diagram of FIG. 2 is applicable. Accordingly, description of FIG. 1 and FIG. 2 will be omitted here because it is made in the first embodiment.

Figure 4B:
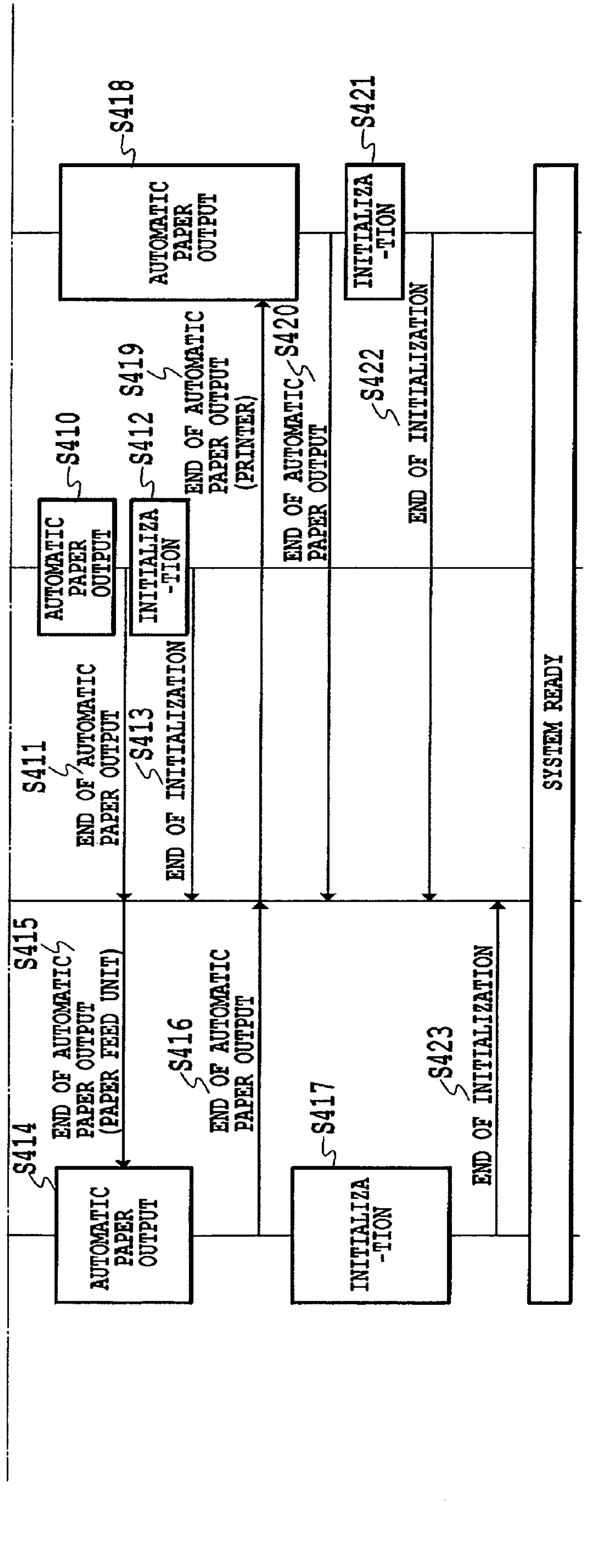
FIG. 4B is a chart illustrating a sequence of a second embodiment in accordance with the present invention.

FIG. 4 is a sequence chart illustrating a control sequence of commands and status in communication between the CPU 201 and CPU 202, between the CPU 201 and CPU 203, and between the CPU 201 and CPU 204, and a control flow of the CPU 202, CPU 203 and CPU 204 at power-on or initialization after jam processing in the present embodiment.

In FIG. 4, at step S401, since none of the conveyance sensors 114, 116 and 121 in the printer detect the residual paper, the CPU 203 notifies the CPU 201 that it is in a residual paper check start instruction waiting mode. At step S402, detecting the residual paper with the paper outlet sensor 111, the CPU 202 notifies the CPU 201 that the residual paper to be subjected to the automatic paper output is present. At step S403, since no residual paper is present in the optional paper output unit 103, the CPU 204 notifies the CPU 201 that it is in a residual paper check start instruction waiting mode.

After receiving confirmation from all the units that they either include the residual paper to be subjected to the automatic paper output, or are in the residual paper check start waiting mode, the CPU 201 instructs all the units to prepare the automatic paper output simultaneously at step S404 in order to carry out automatic paper output of the residual paper of the optional paper feed unit 101. Receiving the automatic paper output preparing instruction at step S404, all the units prepare the automatic paper output at step S405, and notify the CPU 201 of the completion of the preparation of the automatic paper output at step S406, step S407, and step S408 when the preparation has been completed.

Confirming that the preparation of the automatic paper output of all the units has been completed, the CPU 201 instructs all the units to start the automatic paper output operation simultaneously at step S409. Receiving the automatic paper output start instruction, the CPU 202 starts driving the conveying path roller at step S410 to convey the residual paper on the paper outlet sensor to the printer 102. After driving a predetermined time period, and when another predetermined time period has elapsed from the time when the paper present or absent state of the paper outlet sensor 111 changes from the paper presence to paper absence, the CPU 202 makes a decision that the residual paper has been transferred to the printer at the timing at which the rear edge of the paper has passed through the optional paper feed unit. Then, at step S411, the CPU 202 notifies the CPU 201 of the completion of the automatic paper output. In addition, simultaneously with the completion of the automatic paper output, the CPU 202 stops the driving of the optional paper feed unit, carries out the initializing processing at step S412, and notifies the CPU 201 of the completion of the initialization at step S413. The term "initializing processing" refers to paper feed preparing processing of the paper feed unit such as lift up operation of a lifter (not shown) for holding recording mediums in the lower deck 106 and upper deck 107 in the optional paper feed unit 101.

Receiving the automatic paper output start instruction at step S409, the CPU 203 starts the automatic paper output by driving the main motor 220 at step S414. After receiving the notification that the optional paper feed unit 101 has completed the automatic paper output from the CPU 201 at step S415, the CPU 203 considers that the notification indicates that none of the sensors has detected the paper for a predetermined time period continuously. Subsequently, after a predetermined time period has elapsed, the CPU 203 makes a decision that the automatic paper output has been completed, and notifies the CPU 201 of the completion of the automatic paper output at step S416. Following it, the CPU 203 carries out the initializing processing such as starting the fixing unit and initializing the electrophotographic process at step S417.

The CPU 204, receiving the automatic paper output instruction from the CPU 201 at step S409, drives the conveying roller 123 at step S418 to start the automatic paper output operation. When the inlet sensor continues not detecting the paper for a predetermined time period after the CPU 204 receives the notification that the printer 102 has completed the automatic paper output from the CPU 201 at step S419, the CPU 204 makes a decision that the automatic paper output is completed. Then, the CPU 204 notifies the CPU 201 of the completion of the automatic paper output at step S420. Following that, the CPU 204 starts the initialization of the optional paper output unit 103 (such as moving the paper output bin to its home position) at step S421.

Receiving the notification that the automatic paper output has been completed from all the units, the CPU 201 makes a decision that the automatic paper output operation has been completed. After completing initializing step S421 of the optional paper output unit 103, the CPU 204 notifies the CPU 201 of the completion of the initialization at step S422. When initializing step S417 of the printer 102 has been completed, the CPU 203 notifies the CPU 201 of the completion of the initialization at step S423. When the CPU 201 confirms the completion of the initialization of all the units, it makes a decision that the system is ready, and enables the print operation.

Thus, when the residual paper is detected in the optional paper feed unit 101, for example, the CPU 201 issues the automatic paper output preparing instruction to the printer 102, optional paper feed unit 101, and optional paper output unit 103 all at once. Then, recognizing that all the units have completed the preparation of the automatic paper output, the CPU 201 issues the automatic paper output start instruction to all the units all at once, thereby completing the automatic paper output operation in the order of the optional paper feed unit→printer→optional paper output unit.

These operations are performed in response to the instructions from the CPU 201 with recognizing between the individual units that the residual paper check has been completed. As a result, the printer, to which the optional paper feed unit and optional paper output unit are connected, can carry out the automatic paper output operation optimally. This makes it possible to eliminate the useless operation such as driving the motors more than necessary for the automatic paper output operation.

As described above, according to the present invention, a conveyance control means is provided for sequentially driving each of a plurality of conveyance means along a series of the conveying paths after making a decision as to whether a recording medium remains on the series of the conveying paths with a plurality of recording medium detection means before making the image forming on the recording medium. This enables the optimization of the detection processing of the residual paper in the apparatus, which is carried out at power-on or jam recovery, and of the timing of the start/stop processing of the automatic paper output, thereby being able to improve the usability of the apparatus by reducing the initializing time period of the units.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes.

What is claimed is:

1. An image forming system including a feed unit for supplying a recording medium, and an image forming unit for forming an image on the recording medium, said image forming system comprising:

a recording medium detecting section for detecting the recording medium which stays in a conveying path of said feed unit;

an instructing section for instructing said feed unit and said image forming unit to start operation to eject the recording medium which is detected with said recording medium detecting section;

an image forming control section for causing said image forming unit to start recording medium conveyance operation in response to an operation start instruction by said instructing section; and a feeding control section for causing said feed unit to start recording medium conveyance operation in response to the operation start instruction by said instructing section, and for transmitting an operation completion signal of said feed unit to said instructing section when the conveyance operation has been completed, wherein said instructing section transmits the operation completion signal to said image forming control section, and said image forming control section detects a transportation state of the recording medium in response to the operation completion signal and decides whether the recording medium conveyance operation of said image forming unit was completed based on the transportation state of the recording medium.

2. The image forming system as claimed in claim 1, further comprising a second recording medium detecting section for detecting a recording medium being conveyed through a conveying path of said image forming unit, wherein said image forming control section detects the transportation state of the recording medium based on a detecting result of the second recording medium detection section.

3. The image forming system as claimed in claim 1, further comprising a paper output unit for performing paper output processing of the recording medium, wherein said instructing section instructs said feed unit, said image forming unit and said paper output unit to start operation, when said recording medium detecting section detects the recording medium, and a third control section for deciding completion of recording medium conveyance operation of said paper output unit in response to an operation completion signal transmitted from said image forming control section.

4. The image forming system as claimed in claim 2, further comprising a third recording medium detecting section for detecting a recording medium being conveyed through a conveying path to said paper output unit, wherein said third control section causes said third recording medium detecting section to detect the recording medium in response to the operation completion signal fed from said image forming control section, and decides completion of the operation of said paper output unit in response to the detection result.

5. The image forming system as claimed in claim 1, wherein said feeding control section transmits, when said recording medium detecting section detects the recording medium, information about detection of the recording medium to said instructing section.

6. The image forming system as claimed in claim 5, wherein said feeding control section carries out initializing operation of said feed unit after transmitting the information.

7. The image forming system as claimed in claim 2, wherein said image forming control section carries out initializing operation of said image forming unit after completing operation of said image forming unit.

8. The image forming system as claimed in claim 4, wherein said third control section carries out initializing operation of said paper output unit after completing operation of said paper output unit.

9. A control method of an image forming system including a feed unit for supplying a recording medium, and an image forming unit for forming an image on the recording medium, said control method comprising:

a first notification step of notifying an instructing section which instructs an operation of said image forming unit or said feed unit that the recording medium stays in a conveying path of said feed unit;

an instruction step of causing said instructing section to instruct said feed unit and said image forming unit to start operation to eject the recording medium;

a first control step of causing said image forming unit to start recording medium conveyance operation in response to an operation start instruction in the instruction step;

a second control step of causing said feed unit to start recording medium conveyance operation in response to the operation start instruction;

a second notification step of sending an operation completion signal to said instructing section when the recording medium conveyance operation of said feed unit has been completed;

a third notification step of sending the operation completion signal from said instructing section transmits to said image forming unit;

a detection step of detecting a transportation state of the recording medium in the image forming unit in response to the operation completion signal; and a decision step of deciding whether the recording medium conveyance operation of said image forming unit was completed based on the transportation state of the recording.

10. The control method as claimed in claim 9, wherein said image forming system further comprising a paper output unit for carrying out paper output processing of the recording medium, and wherein said instruction step causes said instructing section to instruct said feed unit, said image forming unit and said paper output unit to start operation.

11. The control method as claimed in claim 9, further comprising:

a fourth notification step of sending an operation completion signal to said instructing section when the recording medium conveyance operation of said image forming unit has been completed.

12. The control method as claimed in claim 11, wherein said image forming system further comprising:

a paper output unit for carrying out paper output processing of the recording medium; and a decision step of deciding completion of the recording medium conveyance operation of said paper output unit in response to the operation completion signal.

13. The image forming system as claimed in claim 1, wherein said feeding control section carries out initializing operation of said feed unit with the recording medium conveyance operation of said image forming unit.

* * * * *